United States Patent [19]
Cote et al.

[11] Patent Number: 5,416,837
[45] Date of Patent: * May 16, 1995

[54] TELEPHONE NETWORK INTERFACE ENCLOSURE

[75] Inventors: Mark P. Cote, Springvale; John J. Napiorkowski, Cape Elizabeth; Thomas W. Kroll, Portland; Walter K. Butler, Sebago Lake; Boyd G. Brower; N. Peter Mickelson, both of Gorham, all of Me.

[73] Assignee: Siecor Puerto Rico, Inc., Hickory, N.C.

[ * ] Notice: The portion of the term of this patent subsequent to Oct. 6, 2009 has been disclaimed.

[21] Appl. No.: 956,531

[22] Filed: Oct. 5, 1992

Related U.S. Application Data

[63] Continuation-in-part of Ser. No. 523,457, May 15, 1990, Pat. No. 5,153,910.

[51] Int. Cl.$^6$ .............................................. H04M 9/00
[52] U.S. Cl. .................................... 379/399; 379/412; 379/442
[58] Field of Search ............... 379/399, 412, 441, 442; 361/356

[56] References Cited

U.S. PATENT DOCUMENTS

| | | |
|---|---|---|
| D. 292,089 | 9/1987 | Smith et al. |
| D. 315,140 | 3/1991 | Dowler . |
| 4,062,053 | 12/1977 | Cwirzen . |
| 4,086,648 | 4/1978 | Hines et al. . |
| 4,159,500 | 6/1979 | Baumbach et al. . |
| 4,160,880 | 7/1979 | Brey . |
| 4,488,008 | 12/1984 | Dellinger et al. ............... 179/81 |
| 4,516,818 | 5/1985 | Johnston et al. . |
| 4,560,839 | 12/1985 | Dillard ............... 179/81 |
| 4,588,238 | 5/1986 | Mickelson et al. ............... 339/91 |
| 4,613,732 | 9/1986 | Cwirzen et al. ............... 179/178 |
| 4,624,514 | 11/1986 | Smith ............... 379/412 |
| 4,647,725 | 3/1987 | Dellinger et al. ............... 329/29 |
| 4,723,919 | 2/1988 | Crane ............... 439/521 |
| 4,741,032 | 4/1988 | Hampton ............... 379/399 |
| 4,742,541 | 5/1988 | Cwirzen et al. ............... 379/412 |
| 4,749,359 | 6/1988 | White ............... 439/133 |
| 4,789,348 | 12/1988 | Hampton . |
| 4,800,588 | 1/1989 | Poster, Jr. ............... 379/412 |
| 4,825,466 | 4/1989 | Dowler et al. ............... 379/445 |
| 4,853,960 | 8/1989 | Smith ............... 379/437 |
| 4,860,350 | 8/1989 | Smith ............... 379/412 |
| 4,910,770 | 3/1990 | Collins et al. ............... 379/399 |
| 4,932,051 | 6/1990 | Karan et al. ............... 379/399 |
| 4,945,559 | 7/1990 | Collins et al. ............... 379/399 |
| 4,945,560 | 7/1990 | Collins et al. ............... 379/412 |
| 4,949,376 | 8/1990 | Nieves et al. ............... 379/399 |
| 4,979,209 | 12/1990 | Collins et al. ............... 379/399 |
| 5,102,347 | 4/1992 | Cote et al. ............... 439/412 |
| 5,153,910 | 10/1992 | Mickelson et al. ............... 379/399 |
| 5,291,553 | 3/1994 | Smith ............... 379/412 |
| 5,297,199 | 3/1994 | Graham et al. ............... 379/412 |

OTHER PUBLICATIONS

Keptel, Inc., brochure for the SNI®–4600 Network Interface System, Feb. 1988.
Keptel, Inc., brochure for the SNI®–4600 Network Interface System, Oct. 1991.

(List continued on next page.)

*Primary Examiner*—James L. Dwyer
*Assistant Examiner*—M. Shehata

[57] ABSTRACT

This invention discloses a telephone network interface enclosure comprising a telephone company compartment and a telephone subscriber compartment. Disposed within the telephone company compartment is a metal grounding strip. There is a network termination module disposed within the telephone network interface enclosure. The network termination module is partially disposed in both the telephone company compartment and the telephone subscriber compartment. The network termination module contains a protector element, subscriber terminals and a means for grounding. The subscriber terminals are located in the telephone subscriber compartment. The means for grounding is located in the telephone company compartment and is connected to the metal grounding strip.

7 Claims, 5 Drawing Sheets

OTHER PUBLICATIONS

–2025, NI–2050, NI–2100, NI–2200, GTE Control Devices, Standish, Me., May 1992.

GTE brochure, Introducing the Next Step In the Evolution of Network Interface Technology, GTE Control Devices, Standish, Me., May 1992.

GTE Products Corporation, brochure for the Sylvania Control Devices CP–765 Network Interface Device, printed Jun. 1987.

GTE Products Corporation, brochure for the Sylvania Control Devices CP–761 Network Interface Device, printed Sep. 1989.

Keptel brochure, "The Only Network Interface You'll Ever Use," Keptel, Ocean, New Jersey.

Siecor brochure, "Siecor Introduces New Multiline NID Solutions", Siecor Corp., Hickory, N.C.

Keptel brochure, "SNI–5000, Tomorrow's Network Interface System Today", Keptel Inc., 1985.

GTE brochure, "Weatherproof, Corrosion Proof . . . and We Guarantee It", Sylvania GTE Control Devices, Dec. 1984.

Lippincott brochure, "GL–700 Multi–Unit Network Interface Device", Lippincott Industries, Spokane, Washington, May 1988.

Lippincott advertisement, vol. 211, Telephony, Sep. 9, 1986.

GTE brochure, Protected Terminating Device NI––2006, GTE Control Devices, Standish, Me., May 1992.

GTE brochure, Protected Terminating Device PTD, GTE Control Devices, Standish, Me., May 1992.

GTE brochure, Protected Terminating Devices NI-

TELEPHONE NETWORK INTERFACE ENCLOSURE

This application is a continuation-in-part of U.S. Ser. No. 07/523,457, filed on May 15, 1990, now U.S. Pat. No. 5,153,910, the disclosure of which is incorporated herein by reference.

This invention concerns telephone network interface devices. Such devices are shown in the following U.S. Pat. Nos: 4,488,008; 4,560,839; 4,588,238; 4,624,514; 4,647,725; 4,723,919; 4,741,032; 4,742,541; 4,749,359; 4,800,588; 4,825,466; 4,945,559; 4,979,209. Such devices provide demarcation between the telephone company lines and the telephone subscriber's wiring. Such devices are generally compartmentalized so that the subscriber does not have access to the telephone company's portion of the device. The subscriber has access to a jack, typically an RJ-11C jack, and to terminals to which the subscriber's wiring can be connected. Such jack and terminals are often contained in a network interface module.

This invention is particularly concerned with network interface modules of the type that can be stacked in a side-by-side arrangement in, say, a substantially rectangular telephone network interface enclosure capable of handling a multiplicity of telephone lines. Examples of such enclosures are shown in U.S. Pat. Nos. 4,749,359 and 5,153,910. Examples thereof also are Sylvania CP-761 and CP-765 Network Interface Devices and Keptel SNI-4600 Telephone Network Interface. In such enclosures, the network interface module is generally located in the telephone subscriber's compartment while a protector unit for the module is located separately in the telephone company's compartment.

SUMMARY OF THE INVENTION

In this invention the protector unit is incorporated within the network interface module, herein called network termination module. Such an arrangement provides substantial space savings, which permits almost doubling the number of modules within an enclosure.

This invention discloses a telephone network interface enclosure comprising a telephone company compartment and a telephone subscriber compartment. Disposed within the telephone company compartment is a metal grounding strip. There is a network termination module disposed within the telephone network interface enclosure. The network termination module is partially disposed in both the telephone company compartment and the telephone subscriber compartment. The network termination module contains a protector element, subscriber terminals and a means for grounding. The subscriber terminals are located in the telephone subscriber compartment. The means for grounding is located in the telephone company compartment and is connected to the metal grounding strip.

BRIEF DESCRIPTION OF DRAWING

In FIG. 4, the telephone company compartment of the enclosure is exposed, while in FIG. 5 it is covered.

DESCRIPTION OF THE PREFERRED EMBODIMENT

Figure 1:
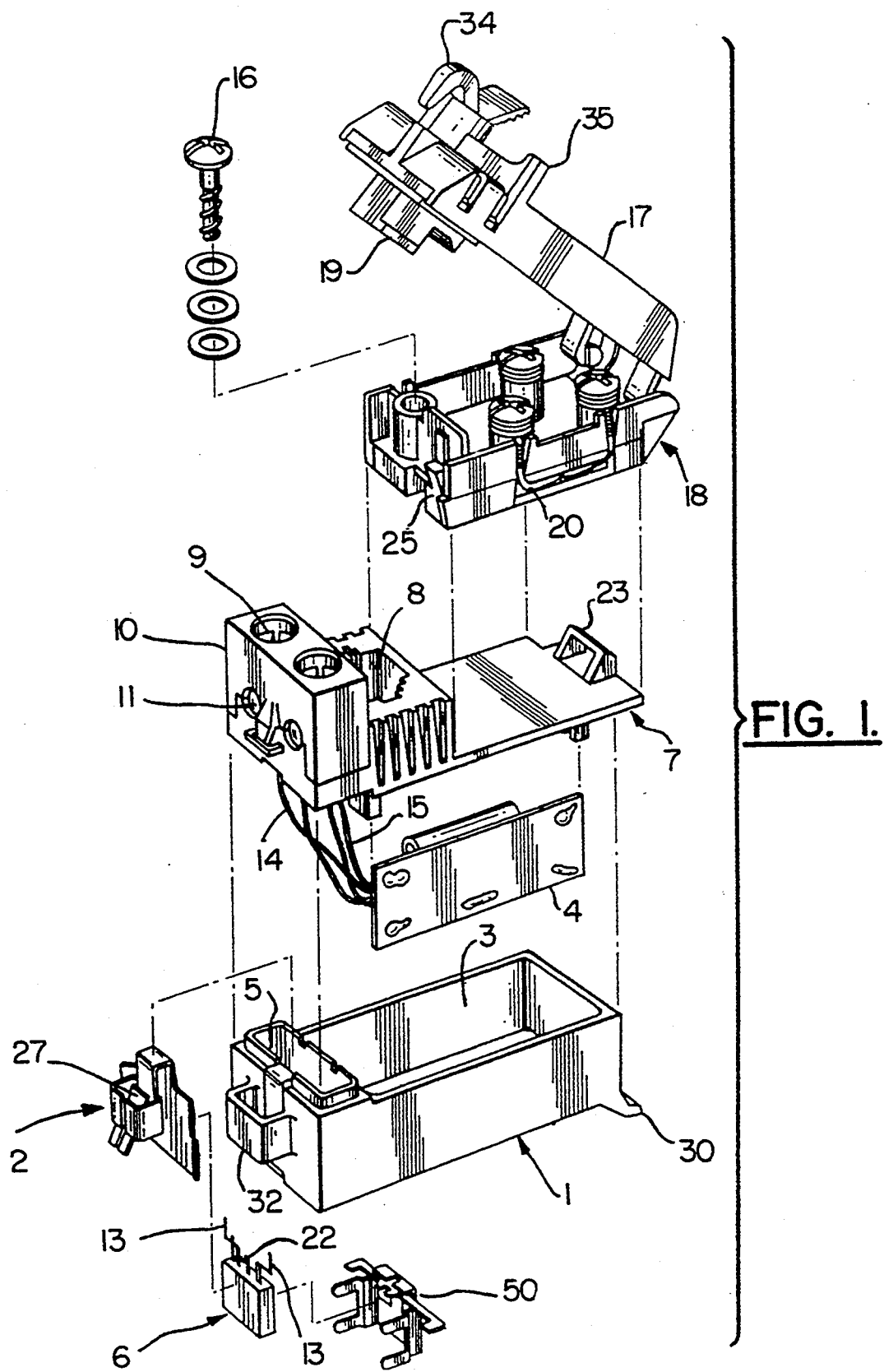
FIG. 1 is an exploded perspective view of one example of a network termination module in accordance with this invention.
Figure 1A:
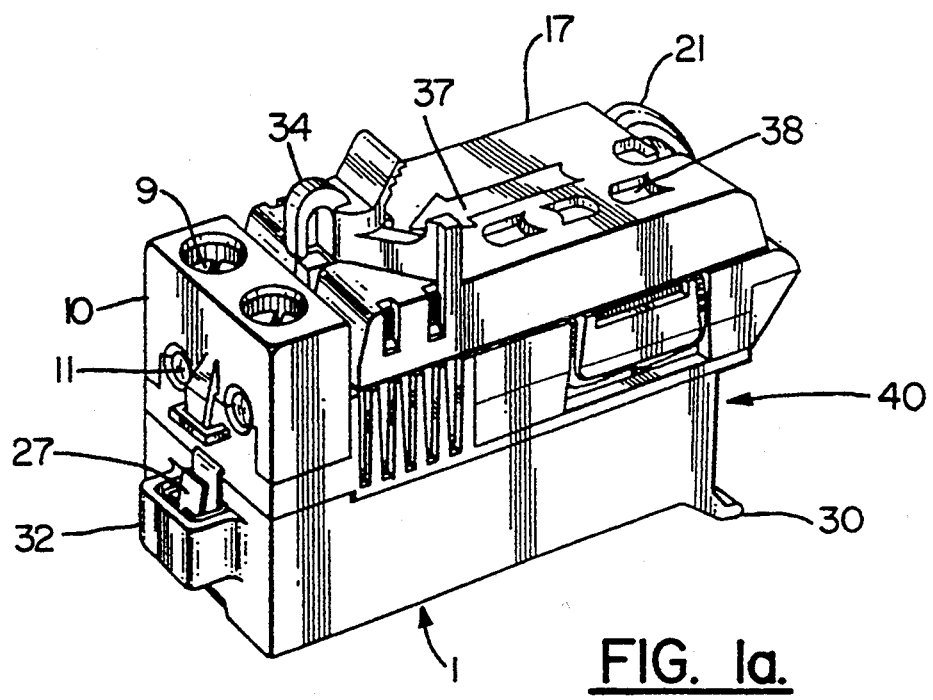
FIG. 1a shows the module with its cover closed.
Figure 1B:
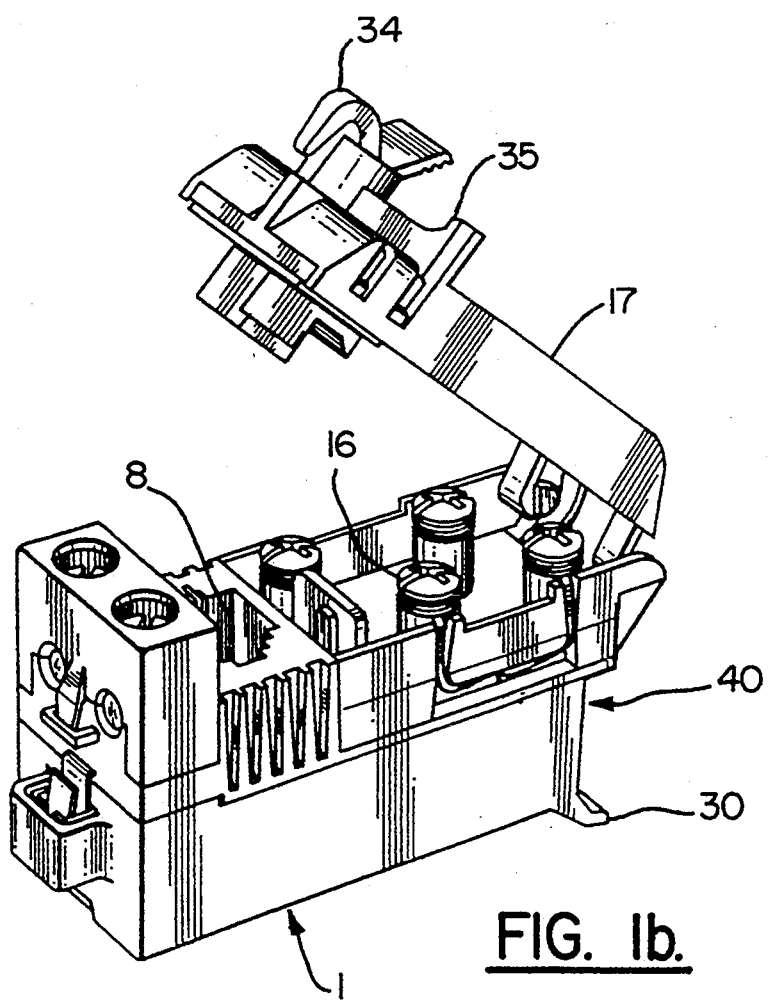
FIG. 1b shows the module with its cover open.
Figure 2:
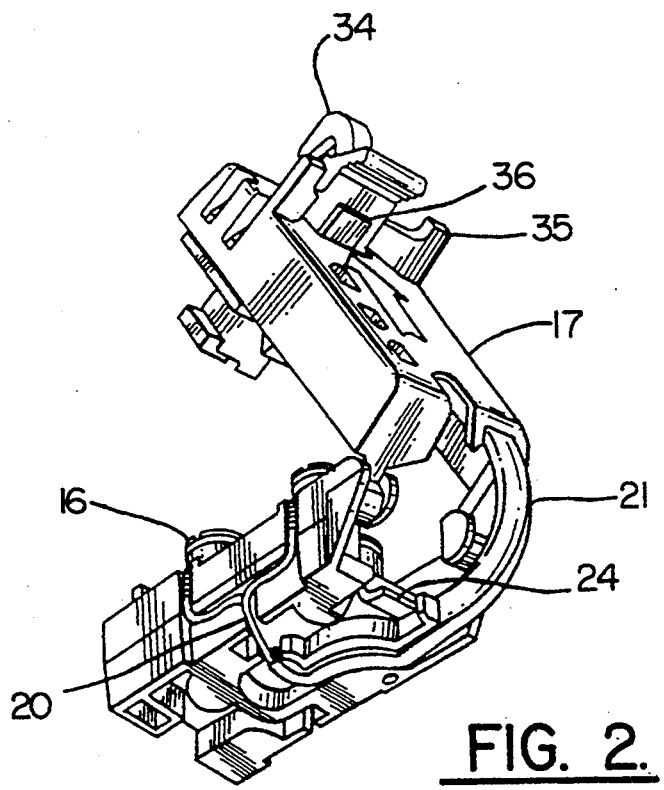
FIG. 2 is a perspective bottom view of the part of the module that contains the subscriber terminals and the cover.
Figure 3:
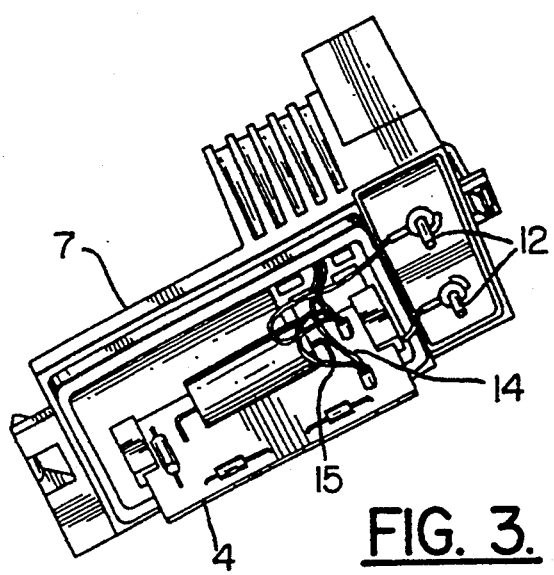
FIG. 3 is a perspective bottom view of the part of the module that contains the line terminals and the telephone jack.

One example of a network termination module 40 in accordance with this invention, as shown in the drawings, comprises a base structure 1 having a means for grounding 2 at one end thereof. Disposed within compartment 3 of base structure 1 is a telephone electronic circuit 4, for example, a maintenance termination unit or a half-ringer. Disposed within compartment 5 of base structure 1 is a protector element 6. Protector element 6 can be a bidirectional voltage sensitive switch, for example, a Surgector made by RCA Corporation or a Sidactor made by Teccor Electronics, Inc., as disclosed in U.S. Pat. No. 5,191,605 the disclosure of which is incorporated herein by reference. Disposed on base structure 1 is a support member 7 on which are disposed a telephone jack 8 and a pair of line terminals 9. Telephone company wiring can be connected to line terminals 9 through wire entry ports 11. Bottom extensions 12 of line terminals 9 are connected to terminals 13 of protector element 6. Wires 14 serve to connect line terminals 9 to telephone electronic circuit 4, and wires 15 serve to connect line terminals 9 to telephone jack 8. Subscriber terminals 16 and openable cover 17 are supported on terminal strip 18. Subscriber terminals 16 are electrically connected to telephone plug 19 by means of wires 20 and cable 21. When openable cover 17 is closed, telephone plug 19 is inserted into telephone jack 8 which establishes electrical connection between line terminals 9 and subscriber terminals 16. The electrical connection is broken when openable cover 17 is opened.

Grounding terminal 22 of protector element 6 is connected to means for grounding 2 in order to provide for the grounding of a voltage or current surge appearing at either line terminal 9. Protector element 6 is encased in protector assembly 50 to which means for grounding 2 is attached.

Support member 7 can be secured to base structure 1 by ultrasonic welding. Support member 18 can be removably attached to support member 7 by means of hinge means 23 on support member 7, into which fits extension 24 of support member 18, and by means of releasable snap latch 25 fitting into an indent in support member 7. The removability of support member 18 permits replacement of telephone plug 19 and subscriber terminals 16, if necessary, without the need of replacing the entire module.

Figure 4:
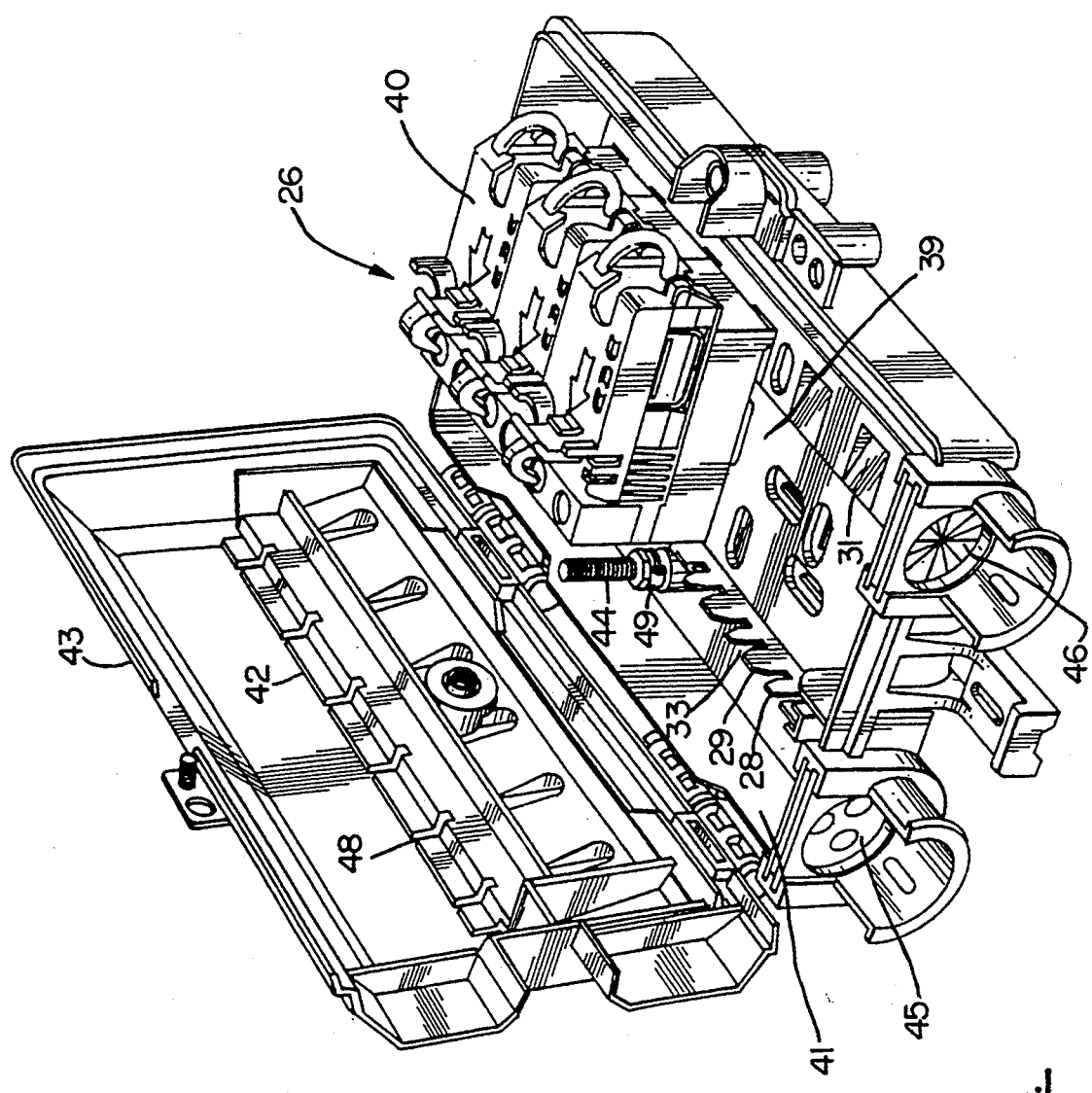
FIG. 4 and FIG. 5 are perspective views of a telephone network enclosure containing the module of FIG. 1.
Figure 5:
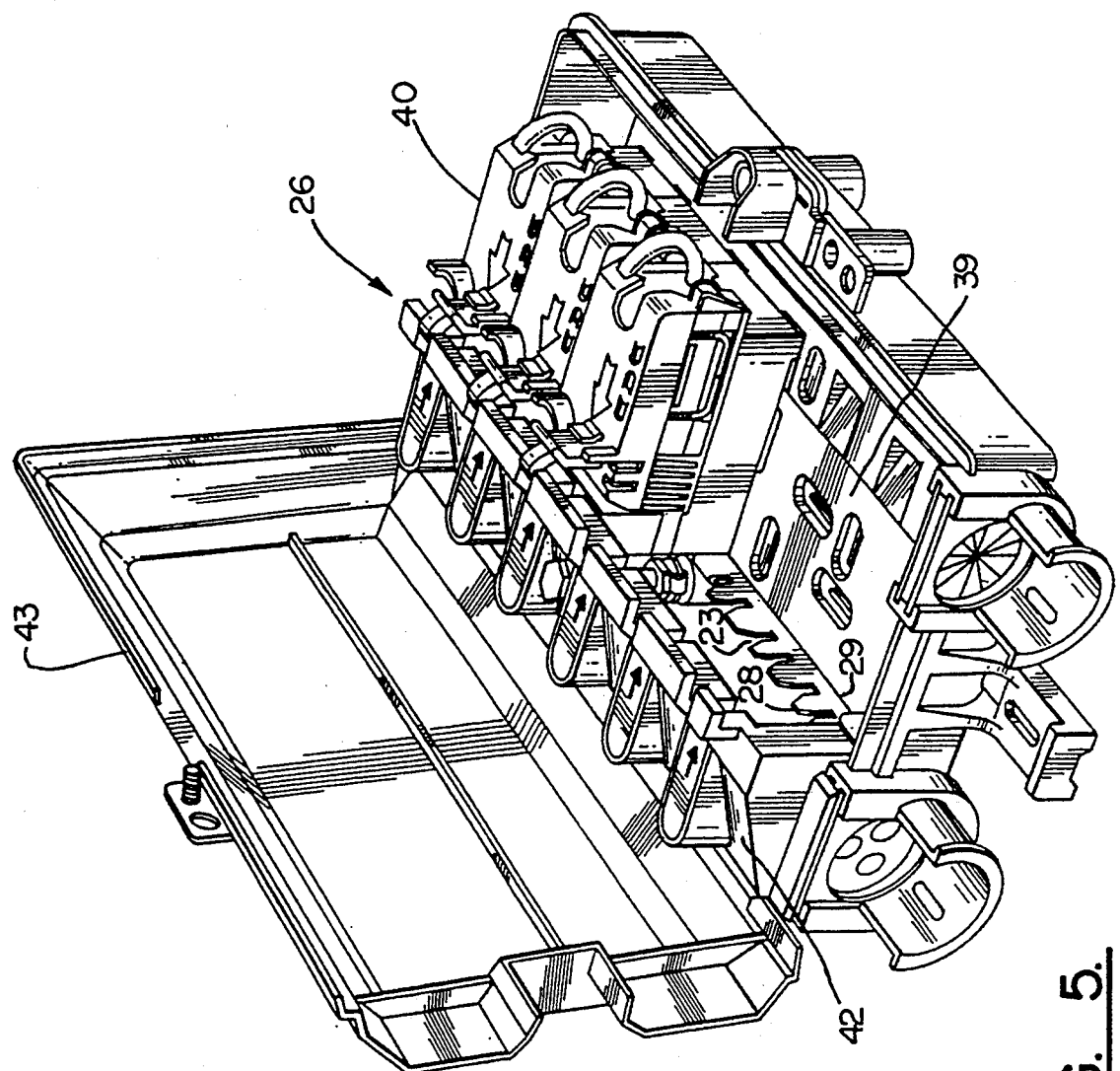

Network interface module 40 can be mounted in an enclosure 26 shown in FIGS. 4 and 5. In one example, grounding clip 27, comprising part of means for grounding 2 of network interface module 40, would clip onto lug 28 of grounding strip 29. The resiliency of grounding clip 27 would aid in its securing onto lug 28. In such an arrangement, tab 30 on base structure 1 would be inserted into recessed depression 31 of enclosure 26 before forcing grounding clip 27 down onto grounding lug 28.

Network termination module 40 may have a shroud 32 surrounding grounding clip 27 for protection thereof. Shroud 32 may fit into notches 33 of grounding strip 29 in order to aid in securing the network interface module in enclosure 26.

Cover 17 has a hook 34 and alignment tabs 35 thereon so that rotation of a padlock (not shown) is prevented when the padlock hasp is placed under hook 34 and over alignment tabs 35. The purpose of such a padlock is to prevent unauthorized access to subscriber terminals 16 and jack 8 by padlocking cover 17 closed.

Cover 17 is secured in the closed position by means of snap action latch 36. Cover 17 can be opened by pressing snap action latch 36 in the direction of arrow 37. Arrow 37 may have a textured writing surface so that a telephone subscriber's telephone number may be written thereon.

Cover 17 has test access holes 38 small enough to prevent finger contact but through which telephone company probes may be inserted to verify telephone service while cover 17 remains closed.

Telephone network interface enclosure 26 contains a telephone subscriber compartment 39 and a telephone company compartment 41. Grounding strip 29 is located in telephone company compartment 41. The major part of module 40 is located in telephone subscriber compartment 39. However line terminals 9 as well as means for grounding 2 are located in telephone company compartment 41. When telephone company cover 42 is closed, as shown in FIG. 5, it covers and prevents access to grounding strip 29 and means for grounding 2, as well as to line terminals 9. Telephone company cover 42 provides the demarcation between telephone subscriber compartment 39 and telephone company compartment 41.

Telephone company cover 42 has a slot 48 therein into which, when cover 42 is closed, fits hook 34 on openable cover 17. Thus when telephone company cover 42 is closed, a padlock (not shown) in place in hook 34 prevents opening of openable cover 17.

Grounding strip 29 is connected to grounding bolt 44 which would be connected to earth ground upon installation of enclosure 26. Telephone company wiring and grounding would be through grommet 45. Subscriber wiring would be through grommet 46.

In one embodiment, grounding strip 29 would be orthogonally mounted on back wall 47 of enclosure 26 by fitting into two upright slots 48 and would be secured by a nut 49 threaded onto bolt 44.

Telephone company cover 42 and subscriber cover 43 are hinged at the same side of enclosure 26. Subscriber cover 43, when closed, covers all of enclosure 26 including cover 42.

We claim:

1. A telephone network interface enclosure comprising: a telephone company compartment; a telephone subscriber compartment; a metal grounding strip disposed in the telephone company compartment; a stand-alone network termination module disposed within the network interface enclosure, part of the network termination module being disposed in the telephone company compartment and part of said module being disposed in the telephone subscriber compartment; the network termination module containing a protector element, subscriber terminals and a means for grounding; the subscriber terminals being located in the telephone subscriber compartment; the means for grounding being located in the telephone company compartment and being connected to the metal grounding strip.

2. The network interface enclosure of claim 1 wherein the network termination module contains line terminals for connection to telephone company wiring, the line terminals being located in the telephone company compartment.

3. The network interface enclosure of claim 1 wherein the demarcation between the telephone company compartment and the telephone subscriber compartment is provided by a telephone company cover which, when closed, covers the metal grounding strip and also covers line terminals contained in the network termination module.

4. The network interface enclosure of claim 2 wherein the protector is connected to the line terminals as well as to the means for grounding.

5. The network interface enclosure of claim 3 wherein the telephone company cover has a slot therein adapted to receive a hook on the network interface module when the telephone company cover is closed.

6. The network interface enclosure of claim 5 wherein the hook is located on a cover on the network termination module.

7. The network interface enclosure of claim 6 wherein the module cover cannot be opened when a padlock is in place in the hook and when the telephone company cover is closed.

* * * * *

UNITED STATES PATENT AND TRADEMARK OFFICE
CERTIFICATE OF CORRECTION

PATENT NO. : 5,416,837  
APPLICATION NO. : 07/956531  
DATED : May 16, 1995  
INVENTOR(S) : Mark P. Cote et al.

Page 1 of 1

It is certified that error appears in the above-identified patent and that said Letters Patent is hereby corrected as shown below:

<u>Title page, item Notice:</u>

Change "The portion of the term of this patent subsequent to Oct. 6, 2009 has been disclaimed." to -- The portion of the term of this patent subsequent to the expiration of U.S. Patent No. 5,479,505 is disclaimed. --

Signed and Sealed this

Third Day of November, 2009

David J. Kappos
*Director of the United States Patent and Trademark Office*